Dec. 5, 1967 HIDEO YOKOTA 3,356,310

ROTARY DRUM FOR MAGNETIC TAPE REELS

Filed June 14, 1966 3 Sheets-Sheet 1

INVENTOR.
HIDEO YOKOTA
BY McGlew and Toren
Attorneys

Dec. 5, 1967 HIDEO YOKOTA 3,356,310

ROTARY DRUM FOR MAGNETIC TAPE REELS

Filed June 14, 1966 3 Sheets-Sheet 2

INVENTOR.
HIDEO YOKOTA
BY McGlew and Toren
Attorneys

INVENTOR.
HIDEO YOKOTA
BY McGlew and Toren
Attorneys

United States Patent Office 3,356,310

Patented Dec. 5, 1967

3,356,310

ROTARY DRUM FOR MAGNETIC TAPE REELS

Hideo Yokota, 2–27 1-chome, Nishinakanobu, Shinagawa-ku, Tokyo, Japan

Filed June 14, 1966, Ser. No. 557,517
Claims priority, application Japan, Apr. 7, 1966, 41/21,457
5 Claims. (Cl. 242—68.3)

ABSTRACT OF THE DISCLOSURE

A rotary drum having a circular wall embraced by an elastic ring. This ring is compressed to hold a reel by a second flange extending from a cap, this second flange fitting outside of the circular wall.

This invention relates to a rotary drum for magnetic tape reels.

More particulary, this invention relates to a rotary drum, in an electronic computer, for supporting and driving magnetic tape reels.

An object of the present invention is to provide a rotary drum for magnetic tape reels in an electronic computer, wherein one or more reels wound with magnetic tape can be installed onto the rotary drum tightly by the friction of a frictionable and elastic annular body placed between a wall of the rotary drum and the reels.

Another object of the present invention is to provide a rotary drum for magnetic tape reels in an electronic computer as aforementioned, wherein the friction between the elastic annular body, the wall of the rotary drum and the reels is easily adjustable and releasable by turning a rotary knob provided on the rotary drum.

A further object of the present invention is to provide a rotary drum for magnetic tape reels in an electronic computer as aforementioned, in which a limiting means is additionally provided on the rotary drum to limit inward movement of the rotary knob.

With these objects in view and other objects which will be set forth hereinafter, the arrangement and construction of each part will be described in the following specification and the appended claims.

Figure 1:
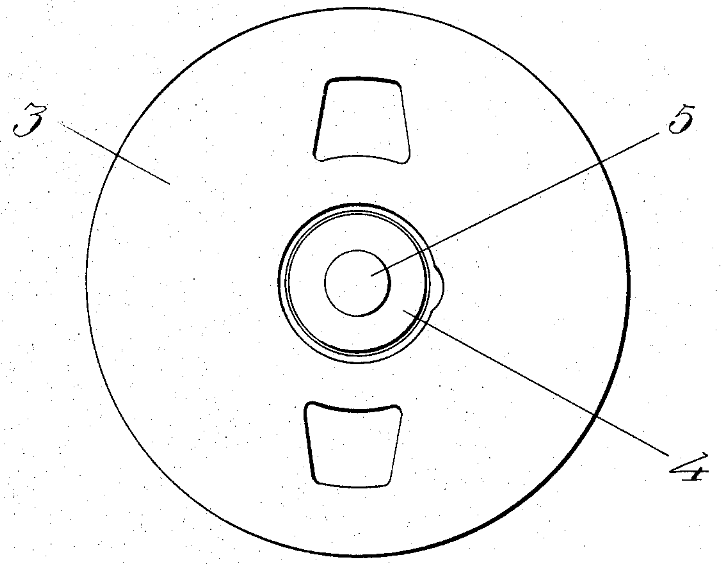
FIG. 1 is a front elevational view showing an embodiment of the present invention.
Figure 2:
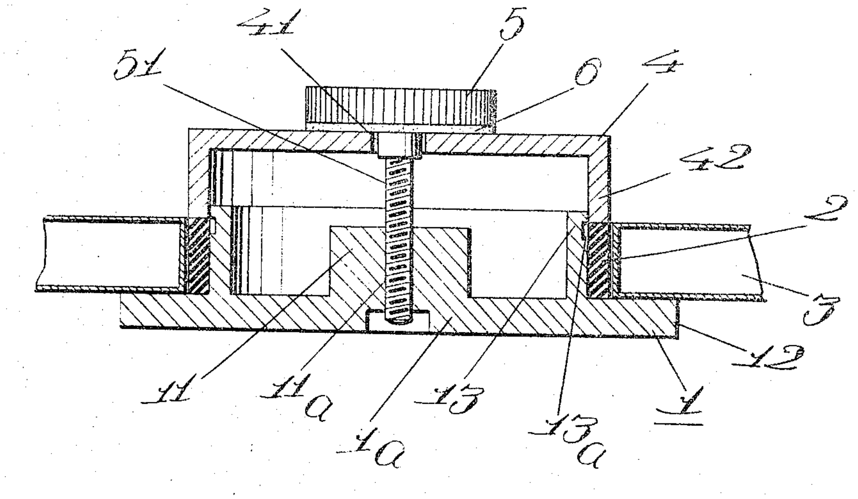
FIGS. 2 and 3 are side elevational views in cross section showing the construction of the substantial parts thereof.
Figure 3:
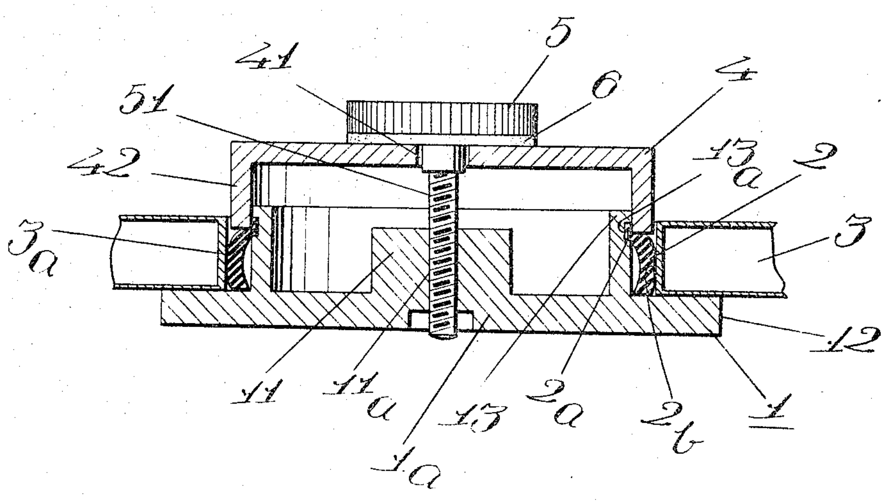

Referring to the accompanying drawings in detail, particularly to FIGS. 1 to 3, a reel 3 is carried by a rotary drum 1 through a frictionable and elastic annular body 2 which is placed between a circular wall 13 of the drum and the reel. A circular edge 2*a* of the annular body, opposite to the circular edge 2*b* thereof abutting on the rotary table or circular plate 1*a*, is a circular cylindrical flange 42 of cap 4. A rotary knob 5 is fitted to the cap through a central aperture 41 bored through the cap and an elastic ring 6 which is placed between the cap and the rotary knob.

In a hub 11 of the rotary table 1*a*, a threaded axial passage 11*a* is provided, and just inwardly of rim portion 12 there is formed the circular cylindrical wall 13 integral with table 1*a*, while on the outer periphery of this circular wall 13 is provided a circular annular groove 13*a*.

The frictionable and elastic body or ring 2 is made preferably from plastic materials such as polyurethane and neoprene. In the center of the cap 4, the hole 41 is provided as above-mentioned for receiving the rotary knob, while the circular flange 42 which is formed on the circumference of the cap is adapted to fit outside of the circular wall 13 of the rotary drum 1 and inside of the reel 3.

The rotary knob 5 is formed with a threaded shank or stem 51 adapted to be screwed to the mating screw thread 11*a* provided on the stub 11 by way of the hole 41.

Explaining the operation, the knob 5 is rotated in a direction to screw the threaded shank 51 from the position as shown in FIG. 2, and the cap 4 is lowered, while pressing the frictionable and elastic annular body by the circular flange 42 thereof. The body 2 is contracted, vertically in the figures, by means of such pressure and the edge 2*a* thereof is forced into the groove 13*a* as shown in FIG. 3. Simultaneously, the elastic body 2 is bent as a whole into an arc shape and the other edge 2*b* thereof pressed onto the marginal side 3*a* of the reel 3, thus coupling the rotary drum 1 and the reel 3 together. If the knob 5 is turned in the opposite direction, the rotary drum 1 and the reel 3 may be uncoupled again.

Figure 4:
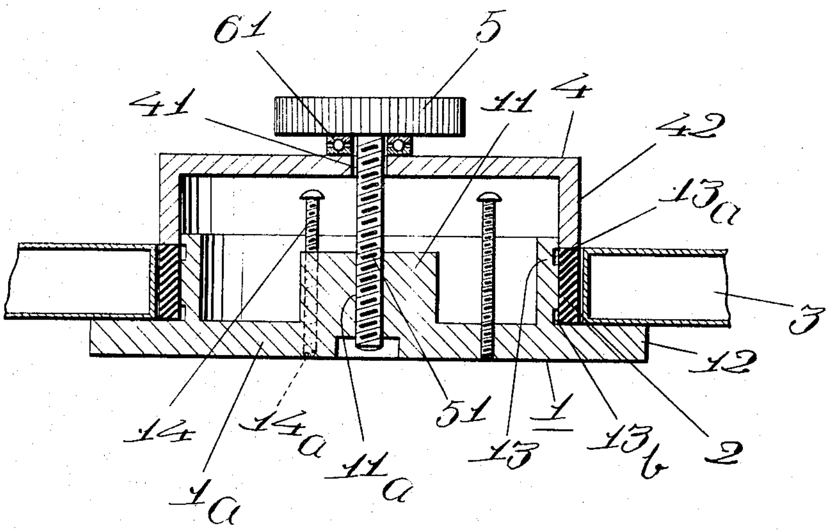
FIG. 4 is a side elevational view in cross section showing another embodiment of the present invention.

In FIG. 4, the members corresponding to those in FIGS. 1, 2, and 3 are indicated by the similar numerals. A thrust bearing 61 is provided between the rotary knob 5 and the cap 4. As in FIGS. 1, 2, and 3, on the hub 11 of the rotary table 1*a* is provided a female thread 11*a* and slightly inwardly of the rim portion 12 of the rotary table 1*a* is formed a circular wall 13 integral with table 1*a*, while at the top and bottom portions on the outer periphery of this circular wall 13 are provided circular annular grooves 13*a*, 13*b*.

A frictionable and elastic annular body or ring 2 is fitted around the circular wall 13 and to the outside of the wall 2 is disengageably fitted a reel 3.

In the center of the cap 4 is provided a hole 41 and on the circumference thereof is formed a circular flange 42 adapted to fit outside of the wall 13 of the rotary drum 1 and inside of the reel 3. The rotary knob 5 is formed with a threaded shank 51 to be screwed onto the mating screw thread 11*a* provided on the stub 11 by way of the hole 41.

Several screw bolts 14 are threadedly fitted to the rotary table 1*a*. The function of these screw-bolts is to prevent the cap 4 from moving further down than is necessary, that is, to set a limit to the amount of pressure applied to the elastic ring to prevent any excessive force applied thereto unnecessarily and also to prevent tilting of the cap 4 while the latter is lowered. The extent to which the screw bolts 14 are screwed or projected can be adjusted at the internal groove 14*a*.

In the embodiment just described, the top and rear edges of the elastic body 2 abut upon the grooves 13*a*, 13*b*.

With the construction of the present invention as described in the foregoing, the rotary drum and the reel may be coupled readily while uncoupling operation of the rotary drum and the reel may be performed in an equally simple manner. Moreover, as the elastic body is compressed, it is bent in an arc shape naturally with the upper edge or with the upper and lower edges thereof inserted into a circular groove or grooves and it is tightly fitted at its rear side onto the marginal side of the reel, while the upper edge thereof pressed down in this way may not be squeezed from the space between the cap and the reel and the discarding of the elastic body due to the excess deformation resulting from such circumstances may be avoided.

Additionally, the present invention enables adjustment of the limit pressure to be applied to the elastic body by means of the cap, and the objects of the present invention as set forth in the beginning of the description can be fulfilled satisfactorily.

While the description of the invention has been limited to two of the embodiments thereof, it is apparent that this invention is not limited to these embodiments but comprises all other structures coming within the purview of the invention defined by the appended claims.

What is claimed is:

1. A rotary drum for magnetic tape reels in an electronic computer, comprising, in combination, a circular plate; a cylindrical wall integral with said plate and extending coaxially therefrom, the outer diameter of said cylindrical wall being substantially less than the diameter of said circular plate; an outwardly opening annular groove formed in the outer peripheral surface of said cylindrical wall adjacent the outer edge of said cylindrical wall; a hub integral with said circular plate and extending centrally therefrom, said hub being formed with a threaded axial passage therethrough; a cap including a circular wall and a cylindrical flange having an inner diameter substantially equal to the outer diameter of said cylindrical wall, said circular wall having a central aperture therethrough; a knob including a knob portion and a threaded stem extending therefrom through said aperture in said circular wall, said stem being threaded into said hub; and a cylindrical elastic friction ring embracing the outer surface of said cylindrical wall and having a radial thickness substantially equal to that of said cylindrical flange, the inner edge of said cylindrical flange engaging the outer edge of said elastic ring; the outer surface of said cylindrical flange being spaced from the inner cylindrical surface of a reel placed on said drum by a distance which is only a minor fraction of the thickness of said elastic ring; the axial dimension of said elastic ring being less than the axial dimension of said cylindrical wall, and the inner edge of said elastic ring engaging said circular plate; whereby, as said knob is turned in a direction to thread its stem further into said hub, said cylindrical flange will deform said elastic ring to force the outer edge thereof into said angular groove and to impart an outwardly convex arcuate shape to said elastic ring so that the convex surface of the latter will engage the inner cylindrical wall of a reel on said drum to frictionally block the reel to said drum.

2. A rotary drum, as claimed in claim 1, in which said cylindrical wall is formed with a second outwardly opening annular groove in its outer peripheral surface, said second annular groove being adjacent said circular plate; the inner end of said elastic ring, when said knob is screwed in, being deformed into said second annular groove.

3. A rotary drum, as claimed in claim 1, including bolt means threaded through said circular plate and extending into said cap and adjustable to limit the inward displacement of said cap during rotation of said knob to limit the pressure applied to said elastic ring by said cap.

4. A rotary drum, as claimed in claim 1, including an annular gasket of friction material interposed between the knob portion of said knob and the outer surface of said circular wall of said cap.

5. A rotary drum, as claimed in claim 1, including an anti-friction thrust bearing interposed between the knob portion of said knob and the outer surface of said circular wall of said cap.

References Cited

UNITED STATES PATENTS

| | | | |
|---|---|---|---|
| 3,000,582 | 9/1961 | Brede | 242—68.3 |
| 3,083,927 | 4/1963 | Prosin | 242—68.3 |
| 3,250,485 | 5/1966 | Fugit | 242—68.3 |

FRANK. J. COHEN, *Primary Examiner.*

N. L. MINTZ, *Assistant Examiner.*